United States Patent

Wenzel

[11] Patent Number: 5,522,268
[45] Date of Patent: Jun. 4, 1996

[54] TURBINE HUB INCLUDING PULSE-GENERATING ELEMENTS SEALING DISPOSED WITHIN A TWO PART MOLDED CONTAINER

[75] Inventor: Manfred Wenzel, Hofheim, Germany

[73] Assignee: Klaus Kobold, Brusells, Belgium

[21] Appl. No.: 224,317

[22] Filed: Apr. 7, 1994

[30] Foreign Application Priority Data

Apr. 7, 1993 [DE] Germany .......................... 43 11 398.2

[51] Int. Cl.⁶ .................................................. G01F 1/075
[52] U.S. Cl. .................................................. 73/861.78
[58] Field of Search .......................... 73/861.77, 861.78, 73/272 R; 324/174, 207.25; 335/303

[56] References Cited

U.S. PATENT DOCUMENTS

| | | | |
|---|---|---|---|
| 4,379,411 | 4/1983 | Laviano et al. ....................... | 73/861.78 |
| 4,385,276 | 5/1983 | Bitzel ....................................... | 324/174 |
| 4,580,121 | 4/1986 | Ogawa .................................... | 335/303 |
| 4,638,281 | 1/1987 | Baermann ............................... | 335/303 |
| 4,935,080 | 6/1990 | Hassell et al. .......................... | 335/303 |
| 5,259,251 | 11/1993 | Brinster et al. ....................... | 73/861.77 |
| 5,315,245 | 5/1994 | Schroeder et al. ..................... | 324/174 |
| 5,325,055 | 6/1994 | Geringer ................................. | 324/174 |

FOREIGN PATENT DOCUMENTS 3733862   4/1989   Germany .

Primary Examiner—Richard Chilcot
Assistant Examiner—Harshad Patel
Attorney, Agent, or Firm—Wenderoth, Lind & Ponack

[57] ABSTRACT

A turbine for a flowmeter includes pulse-generating elements which are distributed at specified angular intervals adjacent to a front wall of a wheel hub for measuring speed. The pulse-generating elements are housed in a pot-like, plastic container having a bottom that forms the front wall. A circumferential wall of the container and the pulse-generating elements, on a side thereof opposite the front wall, are sprayed with a plastic material.

7 Claims, 1 Drawing Sheet

TURBINE HUB INCLUDING PULSE-GENERATING ELEMENTS SEALING DISPOSED WITHIN A TWO PART MOLDED CONTAINER

BACKGROUND OF THE INVENTION

The invention relates to a turbine for a flowmeter with pulse-generating elements which are distributed at specified angular intervals adjacent to a front wall of a wheel hub, such as magnets for measuring speed, e.g. in a flow indication or flowmeter according to DE-OS 37 33 862. Since turbine flowmeters also are used for corrosive mediums, there is the risk with past turbines that the pulse-generating elements, with which the speed and thus the flow rate are determined, will corrode.

SUMMARY OF THE INVENTION

The object of the present invention is to provide a turbine of the aforementioned type, but in which the pulse-generating elements are housed so as to be permanently hermetically sealed.

This object is achieved in essence according to the invention by housing the pulse-generating elements in a pot-like, plastic container having a bottom that forms the front wall of the wheel hub and by spraying a plastic material continuously around a circumferential wall of the container and the pulse-generating elements on a side opposite the front wall. In this manner the pulse-generating elements can virtually no longer be attacked by corrosive mediums.

To simplify the implementation of the invention it can be provided that the bottom changes without a break or intersection into a central bearing sleeve of the wheel hub in order to receive a wheel axle. In so doing, it is especially advantageous if the sprayed plastic material covering the pulse-generating elements on the side opposite the front wall changes without interruption into an encasing of the bearing sleeve. The possible creep paths for corrosive mediums to reach the pulse-generating elements are increased even more if the sprayed plastic material forms a layer covering the entire outer surface of the circumferential wall.

The layer of sprayed plastic material can be shrunk preferably on the circumferential wall. Owing to the resulting shrinkage, an additional pressure per unit of area is produced on the circumferential wall, thus improving and ensuring the hermetic seal.

In a special embodiment of the invention the layer enveloping the circumferential wall has the thickness of the circumferential wall itself.

Another improvement of the hermetic seal can be obtained by bending or directing outwardly the circumferential wall at its free edge facing away from the bottom. The result is a type of undercut which prevents the corrosive medium even more from creeping to the encapsulated pulse-generating elements. In addition, the container is anchored in the sprayed plastic material.

BRIEF DESCRIPTION OF THE DRAWINGS

Other objects, features, advantages and possible applications of the invention will be apparent from the following description of the embodiment of the invention, with reference to the accompanying drawings. At the same time all of the described and/or illustrated features form by themselves or in any arbitrary logical combination the subject matter of the present invention, irrespective of their summary in the claims or their antecedents. In the drawings:

DETAILED DESCRIPTION OF THE INVENTION

Figure 1:
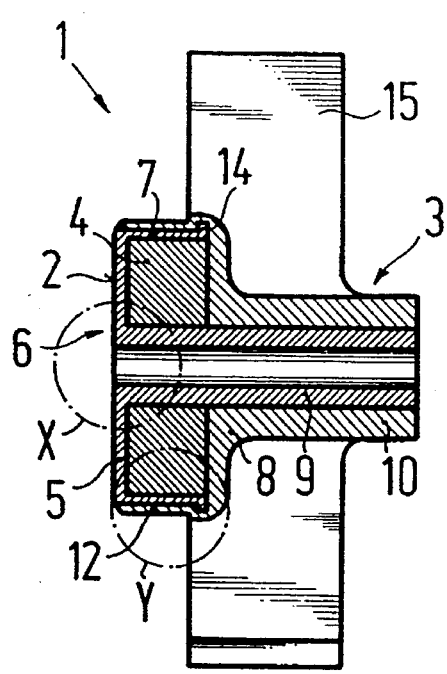
FIG. 1 is a side view, partially in section, of a turbine exhibiting the invention.
Figure 2:
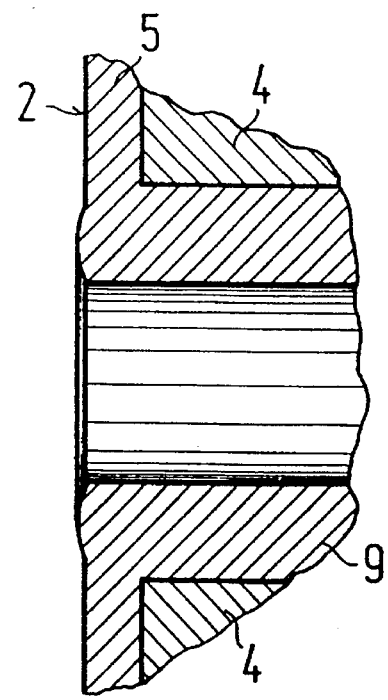
FIG. 2 is an enlarged view of detail X of FIG. 1.
Figure 3:
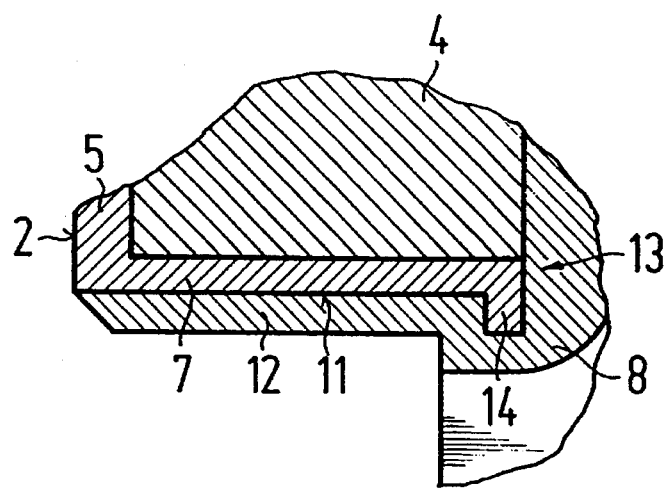
FIG. 3 is an enlarged view of detail Y of FIG. 1.

A turbine 1, depicted in the drawings, is intended for use in a flowmeter. Such turbine includes a wheel hub 3 and vanes 15 attached at equal angular intervals to wheel or turbine hub 3. The wheel hub 3 has a bearing sleeve 9 in order to receive a wheel axle shaft (not illustrated).

The wheel hub 3 is expanded at a first end thereof in order to receive pulse-generating elements 4, which are distributed at specified angular intervals and are designed, e.g., as magnets, ferrite cores, or the like and which are used for measuring the speed of the turbine 1.

An open or first end of the bearing sleeve 9 changes without interruption into an outwardly expanded bottom 5 of a container 6, having an outer circumferential wall 7 enveloping and spaced a certain distance from such end region of the bearing sleeve 9 and made of the same plastic material as the bearing sleeve 9. The essentially cylindrical interior of the container 6 is dimensioned in such a manner that the pulse-generating elements 4 have room for play. The bottom 5 of the container 6, which changes without interruption not only from the bearing sleeve 9 but also without interruption into the circumferential wall 7, forms a relatively thin front wall 2, against which the pulse-generating elements 4 can rest, so that the speed can be measured as effectively as possible from the outside. A rearward free edge 13 of the circumferential wall 7 has an outwardly directed bend 14.

For ensuring a hermetic seal of the pulse-generating elements 4 against the penetration of corrosive mediums, a plastic material 8 which penetrates without interruption is sprayed around the entire outer surface 11 of the circumferential wall 7, the pulse-generating elements 4 on their side opposite the bottom 5 and the bearing sleeve 9. The plastic material 8 forms on the outer surface 11 of the circumferential wall 7 a relatively thin layer 12 of approximately the thickness of the circumferential wall 7 itself. Material 8 spreads around the bend 14 over the rearward opening region of the container 6 to the rearward covering of the pulse-generating elements 4. This is followed without interruption by a relatively thick encasing 10 of the bearing sleeve 9. In this manner relatively long creep paths are provided that corrosive mediums would have to overcome in order to get as far as the pulse-generating elements 4. In addition, the corrosive mediums are prevented from penetrating through the bend 14 forming a type of undercut and further barrier. Especially in the region of the circumferential wall 7 of the container 6 the plastic material 8 can be shrunk on as layer 12. Owing to the existing amount of shrinkage an increased pressure per unit area is exerted by the layer 12 on the outer surface 11 of the wall 7, a feature that renders it even more difficult for the corrosive mediums to penetrate between the circumferential wall 7 and the layer 12. Moreover, the sprayed on and cured plastic material 8 also changes into regions of the vanes outside the hub 3.

I claim:

1. A turbine for use in a flowmeter, said turbine comprising:

a hub including a central bearing sleeve;

one end of said hub having a two part container;

a first part of said two part container comprising said central bearing sleeve, a front wall extending radially outwardly from said central bearing sleeve and defining a bottom of said container, and a circumferential wall extending axially from said front wall and spaced outwardly of said central bearing sleeve, said central bearing sleeve, said front wall and said cylindrical wall comprising an integral one piece structure defining an interior space;

a plurality of pulse-generating elements located within said interior space at specified angular intervals about said hub; and a second part of said two part container comprising a plastic member completely enclosing said circumferential wall, said elements at sides thereof opposite said front wall, and at least part of said central bearing sleeve, thereby hermetically sealing said elements within said container.

2. A turbine as claimed in claim 1, wherein said plastic member is an integral one-piece structure resulting from continuous spraying of plastic material about said circumferential wall, said opposite sides of said elements and said part of said central bearing sleeve.

3. A turbine as claimed in claim 2, wherein said plastic material forms a layer entirely covering the entire outer surface of said circumferential wall.

4. A turbine as claimed in claim 3, wherein said layer comprises a shrunk on layer.

5. A turbine as claimed in claim 3, wherein said layer has a thickness equal to a thickness of said circumferential wall.

6. A turbine as claimed in claim 1, wherein said integral one piece structure of said first part of said two part container further comprises a bend portion extending outwardly from an end of said circumferential wall opposite said front wall, and said plastic member covers said bend portion.

7. A turbine as claimed in claim 1, further comprising vanes extending radially of said hub and integral with said plastic member.

* * * * *